UNITED STATES PATENT OFFICE.

JOHN D. CHEEVER, OF NEW YORK, N. Y.

WATER-PROOF AND PLASTIC COMPOUND.

SPECIFICATION forming part of Letters Patent No. 254,463, dated March 7, 1882.

Application filed January 24, 1882. (Specimens.)

*To all whom it may concern:*

Be it known that I, JOHN D. CHEEVER, a citizen of the United States, residing at New York, in the county of New York and State of New York, have invented certain new and useful improvements in water-proof and plastic compounds which are capable of being calendered into sheets and spread on cloth; and I do hereby declare the following to be a full, clear, and exact description of the invention, such as will enable others skilled in the art to which it appertains to make and use the same.

One very useful application of my compound or composition is for the manufacture of floor-coverings. I will therefore choose this in describing my improvements.

I take of jute reduced to fine powder—that is, ground so that the fibers are not more than one-eighth to three-eighths of an inch in length—ten pounds; spent tan-bark, dried and ground to fine powder, fifteen pounds; pagodite or agalmatolite, ground to fine powder, eight pounds; red chalk, also in fine powder, four pounds; flour sulphur, a half-pound. These powders I thoroughly mix together in a suitable mill. The mixture is next put into an iron mortar, and three pounds of caoutchouc, made miscible by coal-tar naphtha or petroleum naphtha, are added. Then three pounds of the oily, pasty product of petroleum known as "vaseline," described in the patent of Robert A. Chesebrough, dated June 4, 1872, and numbered 127,568, are added. Lastly, five pounds of the product derived from the action of chloride of sulphur on the siccative or drying oils, described in the patent of Alexander Parkes, England, October 22, 1855, and numbered 2,359, are added. All the ingredients are stirred together and pounded with a pestle until they are thoroughly mixed. The mass is then removed to the mullers or masticators for a more thorough treatment, after which it is spread on cloth or burlaps which have been treated in the manner described in my specification filed in the Patent Office, bearing the date of this specification. The calendering-rolls should be heated by steam to a temperature of 150° to 200° Fahrenheit. The sheets formed as I have described should be treated with a solution of protochloride of sulphur in bisulphide of carbon, in the proportion of two parts of the former to one hundred of the latter, by spreading a small quantity over the surface with a brush, and as soon as the solution is applied the sheet should be rolled, so as to inclose the volatile liquid within the folds or windings, thereby economizing the quantity of the liquid which would be otherwise required. After four, five, or more hours, if convenience so appoints, the sheet is unrolled and exposed to the atmosphere, which removes in a short time all traces of the volatile agents employed. The sheets so formed, as I have described, may be varnished, painted, or printed upon in various colors and patterns, as may be desired.

I have found that a very good product is made by using Jonas's "caoutchouc of oils," so called from its properties analogous to india-rubber, prepared by subjecting the drying-oils to a high heat, and boiling the residue in water acidulated with nitric acid, in place of the chloride-of-sulphur product above described. More care should be exercised in the use of that product to remove all traces of acid from it than from the chloride product. For some purposes a very good product may be attained by employing oxidized drying-oils in the place of either of the above-named products. These resinous products are obtained by exposing thin coatings of a drying-oil to atmospheric air. A great objection to the use of these products in the manufacture of water-proof plastic compounds lies in the fact that their oxidation continues until they become brittle and without the cohesive strength required for holding pigments and fibers together, when made into articles of trade which are exposed to the atmosphere. The vaseline removes or remedies this objection. Its own qualities are permanent, and when added to either of the above-described products it arrests their further change, thereby preserving their flexibility.

In some cases or for some purposes I have found that the plastic product obtained by heating old waste vulcanized india-rubber in vaseline or petroleum may be used as a substitute for the caoutchouc described in the directions for preparing the compound. In such case all the steps of preparation are in every other respect proceeded with without change.

I have mentioned vaseline; but instead of this special material I may substitute any of the similar products from petroleum, asphalt, ozocerite, wax, and the like, which have properties similar to vaseline, and will produce substantially the same result in my compounds.

Having thus described my invention, what I claim, and desire to secure by Letters Patent of the United States, is—

1. The compound herein described for forming water-proof and plastic compounds, consisting of disintegrated fibrous materials, earthy materials such as described, sulphur, vaseline, and siccative oil treated with chloride of sulphur, all substantially as described.

2. The use of vaseline with either or any of the products derived from the siccative or drying oils, substantially as and for the purposes described.

3. The use of the products derived from the siccative or drying oils, in combination with the plastic products obtained by heating waste vulcanized rubber with vaseline or petroleum-oil, for cementing pigments and fibers separately or together in the manufacture of water-proof compositions and fabrics, as described.

In testimony whereof I affix my signature in presence of two witnesses.

JOHN D. CHEEVER.

Witnesses:
VICTOR E. BURKE,
ALFRED R. PAGE.